United States Patent
Ziegler et al.

(10) Patent No.: US 8,433,664 B2
(45) Date of Patent: Apr. 30, 2013

(54) METHOD AND SYSTEM FOR ENHANCING AND MERGING COMPUTER OBJECT RULES

(75) Inventors: Carsten Ziegler, Walldorf (DE); Hans-Georg Beuter, Heidelberg (DE); Michael Aakolk, Wiesloch (DE)

(73) Assignee: SAP AG, Walldorf (DE)

( * ) Notice: Subject to any disclaimer, the term of this patent is extended or adjusted under 35 U.S.C. 154(b) by 810 days.

(21) Appl. No.: 12/200,885

(22) Filed: Aug. 28, 2008

(65) Prior Publication Data

US 2010/0057666 A1    Mar. 4, 2010

(51) Int. Cl.
*G06N 5/00* (2006.01)
(52) U.S. Cl.
USPC .......................................................... 706/15
(58) Field of Classification Search .................. 706/59; 705/1
See application file for complete search history.

(56) References Cited

U.S. PATENT DOCUMENTS

2005/0251409 A1*   11/2005   Johnson et al. ................... 705/1

* cited by examiner

*Primary Examiner* — Jeffrey A Gaffin
*Assistant Examiner* — Ola Olude Afolabi
(74) *Attorney, Agent, or Firm* — Kenyon & Kenyon LLP

(57) ABSTRACT

A method, a machine-readable storage medium and a system are provided for revising content in a computer rule set. The revisions may be made by an issuer of content. In an embodiment, it is determined whether a difference exists between content data in a production table corresponding to a computer rule set and enhanced content data in an enhanced data table. If a difference is determined to exist, the content data is read from the production table and the enhanced content data is read from the enhanced data table. The enhancement data is identified as that assigned to the first issuer. Whether the rule enhanced in the computer rule set is allowed to be revised is confirmed. Based on the results of the determining and confirming, the enhanced data from the enhanced data table is incorporated into the production data table to provide a revised computer rule set.

13 Claims, 11 Drawing Sheets

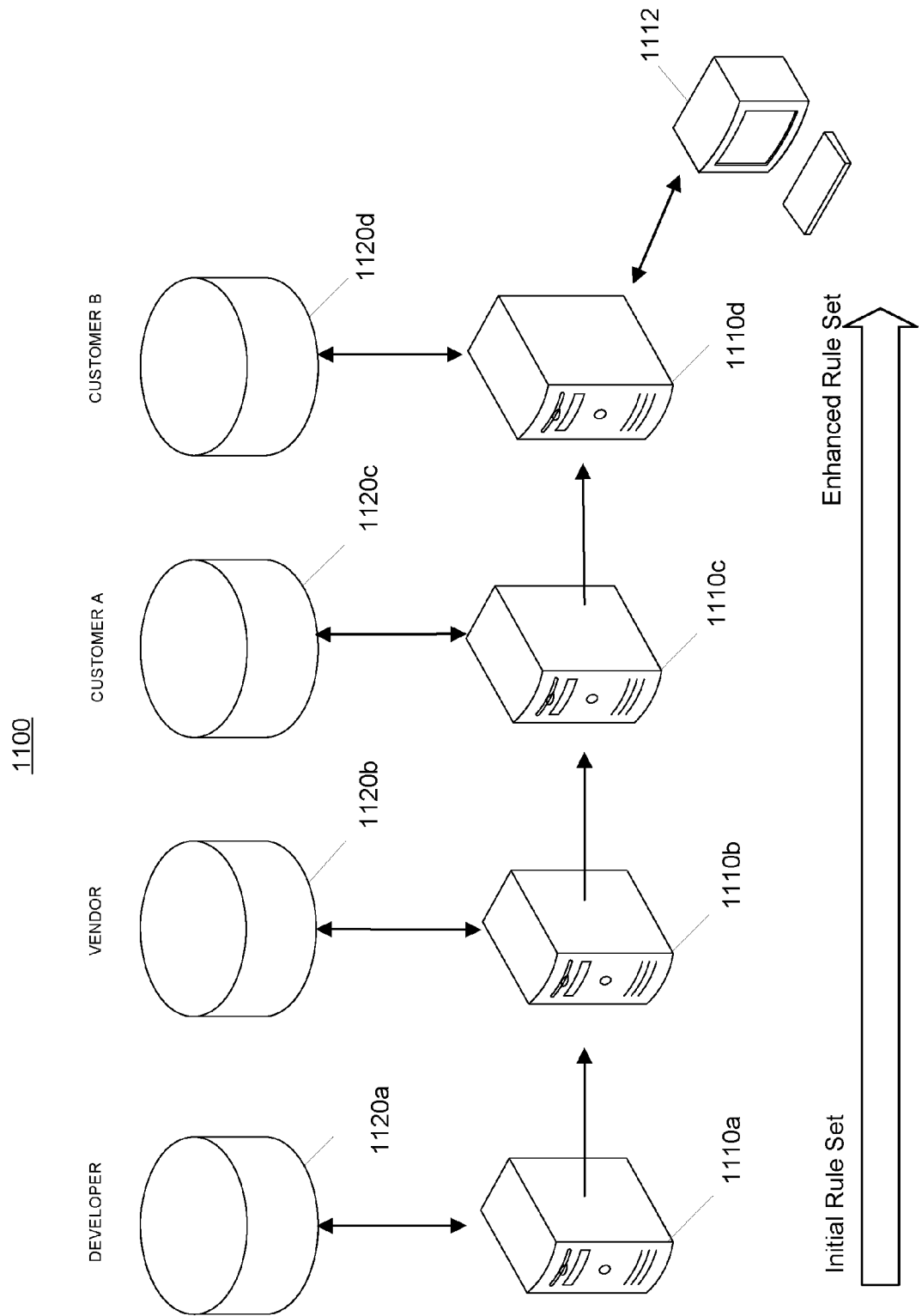

METHOD AND SYSTEM FOR ENHANCING AND MERGING COMPUTER OBJECT RULES

CROSS-REFERENCE TO RELATED APPLICATION(S)

This application is related to U.S. patent application Ser. No. 12/199,798 filed concurrently herewith, which is herein incorporated by reference in its entirety.

COPYRIGHT AND LEGAL NOTICES

A portion of the disclosure of this patent document may contain material which is subject to copyright protection. The copyright owner has no objection to the facsimile reproduction by anyone of the patent document or the patent disclosure as it appears in the Patent and Trademark Office patent files or records, but otherwise reserves all copyrights whatsoever.

FIELD OF INVENTION

The present invention relates to a system, method, and computer-readable medium having instructions to execute a method for enhancing and merging computer object rules.

BACKGROUND

Presently when software content is delivered to an enterprise, the software contains rules for controlling the data on which the software operates and the data flow as well as the modifications that can be made to the software by a user or another third-party. The enterprise can use the software to implement a business process, such as ordering, invoicing and other processes. The software developer/provider typically provides rules that are delivered with a default definition or rule content. The rule content is represented by attributes that can be, for example, the result of a certain event occurs or a value equals a predetermined point and the like. The rule content may be changed by the software provider, for reasons such as issues related to a specific country, e.g., Germany or United States, or industry, e.g., petroleum or shipping. A rule can have a number of attributes. A third-party vendor, such as a software distributor or an installer and integrator of the software provided by the software provider, can also change the rule content by adding, deleting or changing an attribute. Ultimately, the customer will create and/or adopt rules that suit the customer's needs, which may include customized rules. The rule content can be changed by the developer, a second party, such as a vendor, or a third party, such as a customer, or other parties.

Presently these changes to the rule content may conflict with or contradict the default rule set delivered by the software provider and with any new content added by a second party and/or a third-party. This can result in the execution of rules that prevent the customer from manipulating data as the customer desires, or worse, termination of the application, which means the software may be unusable by the customer.

Changes to the rule content occur in two dimensions: the computer and time. Software and rule content are frequently updates with new releases (time based) due to changes over time in business requirements, legal changes, patches to fix latent errors in software and content. While in the computer environment, after rule content was change on various layers during the software and rule content distribution chain (i.e., delivery from developer to partner to ultimate customer) changes from higher layers (e.g., the changes in the new release) must not disturb the changes, either existing or newly released, in following layers when the changes from the higher layers are distributed to following layers.

Accordingly, there exists a need for a system and method for identifying and resolving rule conflicts or collisions, and merging the enhanced rules with previous rules.

BRIEF DESCRIPTION OF THE DRAWINGS

FIG. 11 illustrates an example system for delivering software suite enhancements and merging rule content according to embodiments of the present invention.

DETAILED DESCRIPTION

Figure 1:
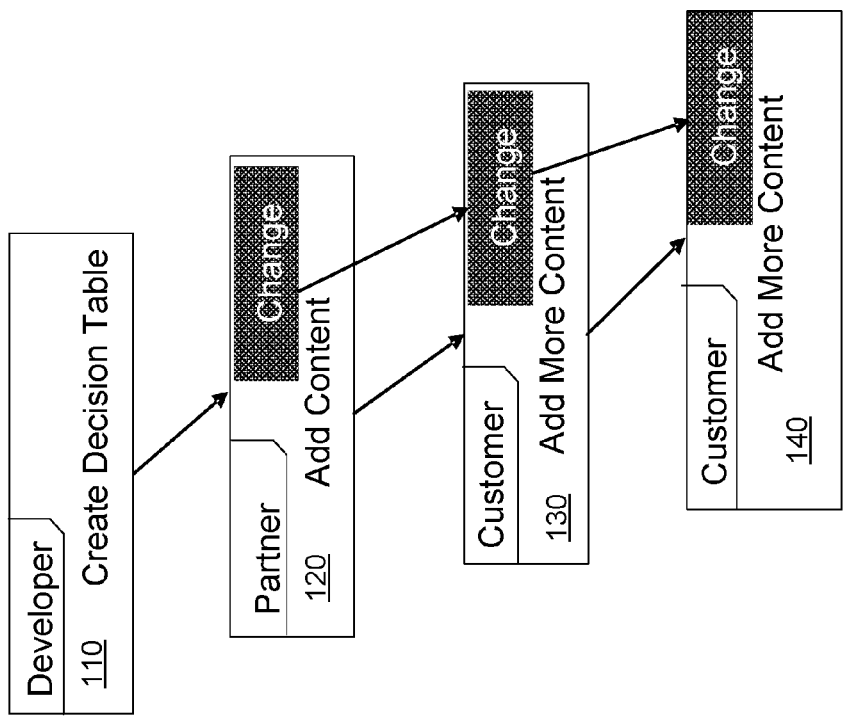
FIG. 1 illustrates a rule precedence methodology according to an embodiment of the present invention.

Embodiments of the present invention provide a method for revising content in a computer rule set, the revisions made by an issuer of content. The method involved determining if a difference exists between content data in a production table corresponding to an initial computer rule set and enhanced content data in an enhanced data table. The enhanced content data is content revised by a first issuer and corresponds to a rule in the computer rule set. In response to determining if a difference exists, the content data is read from the production table corresponding to the initial computer rule set and the enhanced content data is read from the enhanced data table. In an embodiment, the enhancement data is identified that is assigned to the first issuer. It is determined whether the first issuer has an active status. Whether the rule enhanced in the computer rule set is allowed to be revised is confirmed. Based on the results of the determining and confirming, incorporating the enhanced data from the enhanced data table into the production data table to provide a revised computer rule set. The revised computer rule set is implemented so the operation of the rules is different from the operation of the rule in the initial rule set based on the enhanced data received from the issuer.

Embodiments of the present invention provide a machine-readable storage medium embodied with computer instructions for causing a computer to execute the instructions to perform a method for revising content in a computer rule set, the revisions made by an issuer of content. The instructions cause the computer to determine if a difference exists between content data in a production table corresponding to an initial computer rule set and enhanced content data in an enhanced data table. The enhanced content data is content revised by a first issuer and corresponds to a rule in the computer rule set. In response to determining if a difference exists, the content data is read from the production table corresponding to the initial computer rule set and the enhanced content data is read from the enhanced data table. The enhancement data is identified that is assigned to the first issuer. It is determined whether the first issuer has an active status. Whether the rule enhanced in the computer rule set is allowed to be revised is confirmed. Based on the results of the determining and confirming, incorporating the enhanced data from the enhanced data table into the production data table to provide a revised computer rule set. The revised computer rule set is implemented so the operation of the rules is different from the operation of the rule in the initial rule set based on the enhanced data received from the issuer.

Embodiments of the present invention provide a system for revising content in a computer rule set, the revisions made by an issuer of content. The system determines if a difference exists between content data in a production table corresponding to an initial computer rule set and enhanced content data in an enhanced data table. The enhanced content data is content revised by a first issuer and corresponds to a rule in the computer rule set. In response to determining if a difference exists, the content data is read from the production table corresponding to the initial computer rule set and the enhanced content data is read from the enhanced data table. The enhancement data is identified that is assigned to the first issuer. It is determined whether the first issuer has an active status. Whether the rule enhanced in the computer rule set is allowed to be revised is confirmed. Based on the results of the determining and confirming, incorporating the enhanced data from the enhanced data table into the production data table to provide a revised computer rule set. The revised computer rule set is implemented so the operation of the rules is different from the operation of the rule in the initial rule set based on the enhanced data received from the issuer.

Some exemplary terminology used in the present application is as follows:

Attribute is a value or a description (textual or graphical) representing an action that occurs in the context of a process operation, such as a business process. The attribute can be an input event, an input condition, an output decision, or an output reaction. An example of an input condition or input event can be the price of a good, the quantity of goods per unit, non-payment of a bill, late payment, return of goods and the like. The terms "event" and "condition" can be used interchangeably without affecting the scope of the invention. An example of an output decision or output reaction can be to generate a delinquency notice in response to non-payment, the percentage of interest to charge when payment is received late, and the like. The terms "decision" and "reaction" can be used interchangeably without affecting the scope of the invention.

Content is a set of software elements and documentation that enable software to address specific requirements. These requirements can originate from, for example, customer groups, countries, industries, or the like. Content can fulfill one or more of the following criteria: it can convey information on the characteristics and capabilities of the software, it can define or changes the behavior of the software, and it can define or change the appearance of a user interface (UI). In addition, content can define the context in which the software needs to work (such as a composite application, country, industry, and so on), and influences all of the above-mentioned criteria.

Catalog is a collection of codes with related contents. Catalogs can be used to encode content described in text form in a format that can be machine processed. Subsets of codes can be grouped within a catalog according to various criteria. Selected sets of codes can also be created for a particular purpose. Examples of the contents of a catalog include characteristic attributes, usage decisions, and tasks.

Initial Object is an initial object is a rule object that is created with an enhancement category set other than "enhancement not supported". Decision tables and catalog support the enhancement concept. In an embodiment, the enhancement concept is implemented in a variety of different contexts and applications.

Enhancement is the delta data on an object (either initial or already enhanced). Delta content can contain changed attribute values or additional attribute values (e.g., additional nodes in a catalog or additional lines in a decision table).

Enhancement Category defines in which way (or if at all) an object may be enhanced in following layers and systems in general.

Enhancement Type defines in which way (or if at all) an object part (e.g. a node in the catalog) may actually be enhanced in following layers and systems. The possible enhancement types are defined by the enhancement category that is set for the object.

Issuer is a provider of rule content including enhancements. Enhancements may be created with reference to an issuer, which is a business rule framework object itself. Issuers can be created in a software layer (within a package, a software component, or an application component from its application or a combination of the above). Issuers may define a parent issuer so that a hierarchy of issuers and consequently of enhancements can be defined. Issuers may also define the sequence other issuers' enhancements have to be applied, i.e., a precedence. An issuer may be enabled (as a default) or disabled. Disabling an issuer means decoupling enhancements from the issuer content.

Merge relates to the activity of putting the initial object and enhancements for the object together so that one enhanced object is created. Such objects can also be called merged objects. Merges can be triggered by transport after import methods or by XML imports or from a user interface.

Conflict can arise from a contradiction (e.g., system copies with different data exist for the same item) between different issuer content being entered into a system. In a chain of issuers, issuer A may define that issuer C is enabled; whereas issuer B defines that issuer C is disabled. A conflict resolution, for example, may be an end user decision on what content to take from issuer A, B and C.

Transport is the transfer of computer object components from one system to another. The components to be transported are specified in the object list of a transport request. Each transport consists of an export process and an import process. The export process reads objects from the source system and stores them in a data file at operating system level. The import process reads objects from the data file and writes them to the database of the target system. The control system maintains a transport log of all actions during export and import.

Production data table is an operatively used database table of an object. For example, a decision table is saved to a database, and whenever the decision table is processed, it is read from the database and processed used to perform a function of the software. The production data table can store the objects and, if the object supports enhancements, the merged objects.

Enhancement data table (e-table) is similar to the production data table, but has a field for assigning an entity, such as an issuer, to a particular data field. The particular data field being a revision to rule content of a business rule. During a merge or re-merge, an enhancement table can be imported into a production data table and merged to implement a revised, or enhanced, database table of an object. Not all of the data in the enhancement data table does not have to be imported and merged into a production data table. In an embodiment, it is a storage for all enhancements.

FIG. 1 illustrates an exemplary implementation of a software distribution delivery chain according to an embodiment of the present invention. In an exemplary software distribution chain 100, a developer provides an enterprise with a software product that can implement a business process. The developer provides a rule set that has a particular content at 110. The rules can be business rules that are delivered by the developer with a default definition or content that can, based on the inputs, dictate how the software product will react to the input. The rules can be revised by a partner or vendor or by entities within the developer, 120. The customer at 130 can adopt the rules or further revise the rules to customize the system to address the customer's needs. Additional or other customers at 140 can more revisions to the rules. The revisions can be any one or combination of additions to, deletions from, modifications of, changes to or adoption of the rules provided by an upstream provider of the software product.

Figure 2:
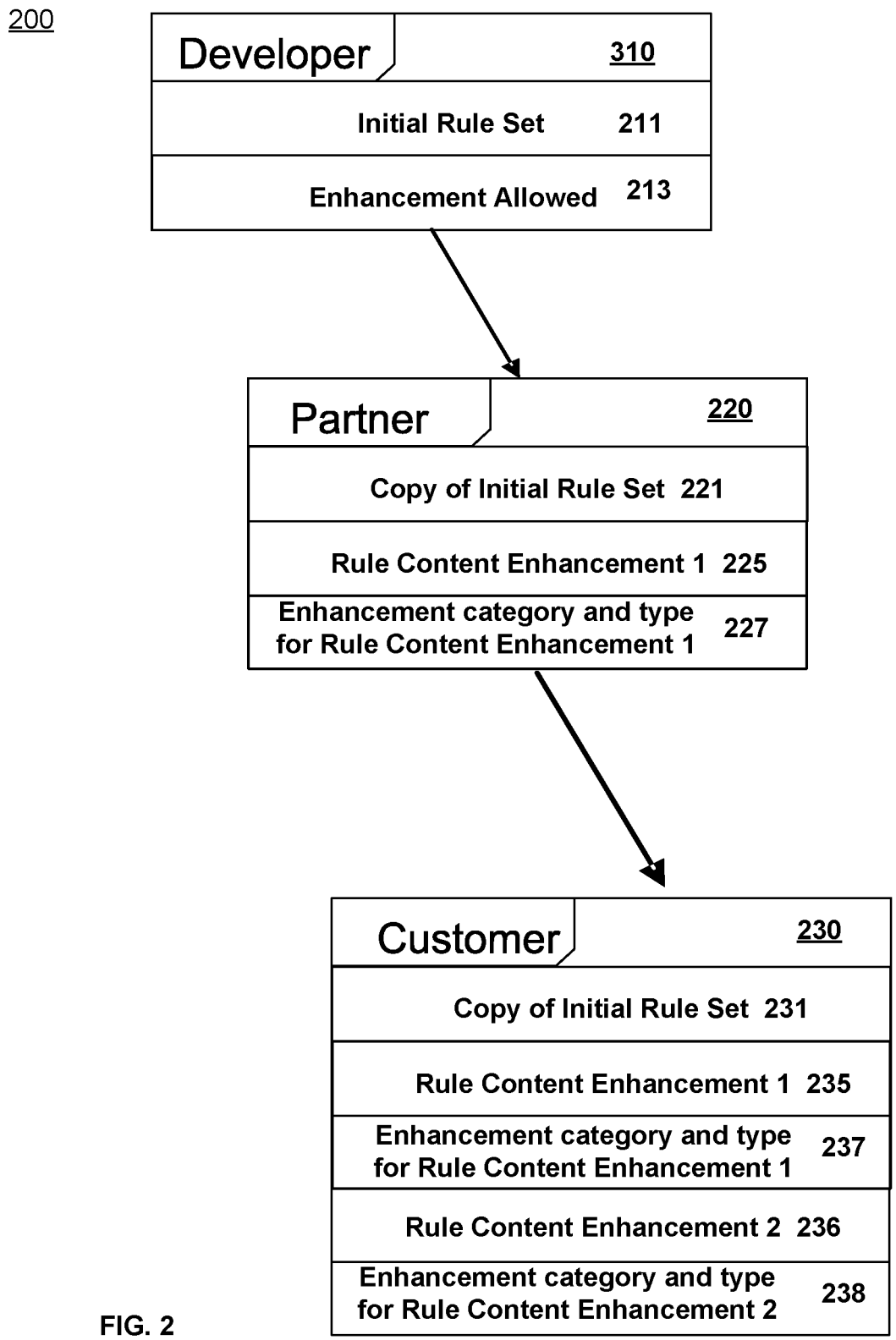
FIG. 2 illustrates an example implementation of changes to rule content according to an embodiment of the present invention.

FIG. 2 illustrates an exemplary implementation of changes to rule content according to an embodiment of the present invention. In an exemplary software distribution chain 200, a developer 210 when developing a software product creates an initial rule set 211. It should be understood that initial rule set 211 includes one rule or a plurality of rules. In an embodiment, the rules in the initial rule set 211 includes attributes. The rules in the rule set can each have data 213 indicating whether enhancement, i.e., revision, of the rule is allowed or not allowed with respect to each rule in the rule set. For the sake of understanding, only one indicator 213 is shown, but it should be understood that only one indicator 213 can be used for all of the rules if the data globally applies to all of the rules in the rule set or each rule can have its own indicator 213. The indicator 213 can initially be set by the developer 210 to allow enhancement depending upon certain settings. The settings can be made in an enhancement category data field and an enhancement type data field. The enhancement category defines in which way (or if at all) an object may be enhanced in following layers and systems in general. Based on the enhancement category, specific attributes can changed, for example, in the initial decision table, cells and columns can be changed. The enhancement category can also indicate which users, e.g., customer, vendor, can change the object. The enhancement type further defines the enhancement as described above.

In an embodiment, the indicator 213 includes fields including enhancement category and enhancement type. The developer delivers the software product including a copy of the initial rule set 211 with indicator 213 to a partner/vendor 220. The partner/vendor 220 revises rule content through Rule Content Enhancement 1 225. This revision revises the developer content provided in the copy of the initial rule set 221. This revised content added by the partner/vendor either overwrites or otherwise destroys the developer content in the copy of the initial rule set 221.

The Content Enhancement 1 225 includes data that indicates that it is a revision made by the partner/vendor 220. The partner/vendor revision can also have an indicator 227 that indicates through settings of the enhancement category and enhancement type, whether the rule content in Rule Content Enhancement 1 can be further revised and by whom. The Rule Content Enhancement 1 and 2 can include a data field indicating the entity, e.g., partner or customer, that made the rule content enhancement. In an embodiment, a customer 230 revises the rules, for example, by adding its own Rule Content Enhancement 2 236 that has indicator 238, which has fields enhancement category and enhancement type. The enhancement category and enhancement type in indicator 238 indicates whether the customer Rule Content Enhancement 2 236 can be further revised and by whom. Once the customer has customized the rule set to implement the customer's business process, the rule set must be evaluated. This can be done by applying the rules in a decision table that will be described in more detail with respect to FIG. 3.

Figure 3:
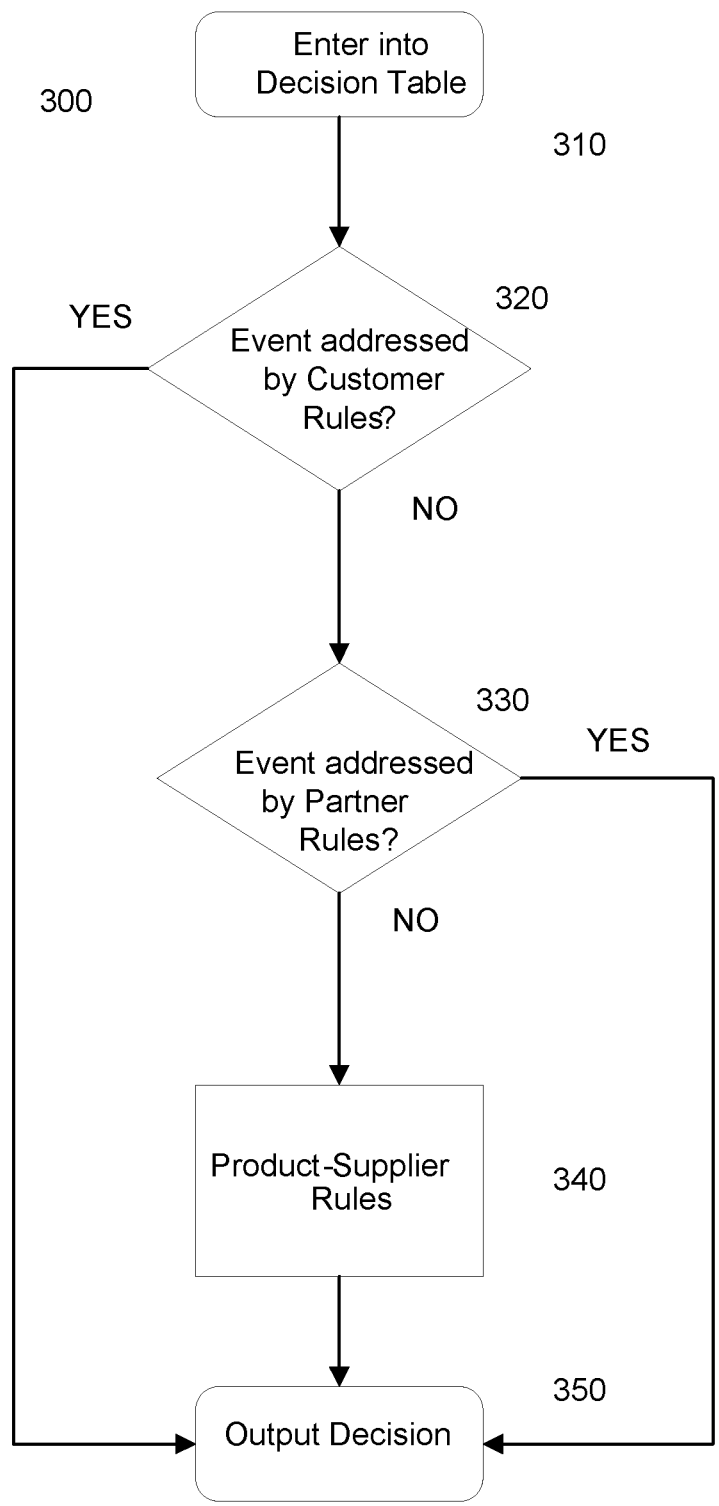
FIG. 3 illustrates an example representation for a rule according to an embodiment of the present invention.

FIG. 3 illustrates a rule precedence methodology according to an embodiment of the present invention. The process 300 of the exemplary embodiment illustrates the implementation of a precedence of rules when a system is evaluating the rules during a business process. During a business process certain events occur, such as an invoice not being paid, that require a predetermined response be made. In step 310, the system enters into the decision table in response to the event to determine the response. At step 320, the customer rule content is implemented over the content in the rules of either the vendor or developer. If the customer rule content addresses the particular event by specifying a particular result, a decision is made and the process flows to output decision 350. Otherwise, if the customer rule does not specifically address the particular event in the business process, the precedence slips to the vendor rules. In step 330, the vendor rules are evaluated because a particular event is not addressed by the customer rules. If the vendor rule content addresses the particular event by specifying a particular result, a decision is made and the process flows to output decision 350. However, if the vendor rule content does not specifically address a particular event in the business process, the precedence slips to the developer rules. In step 340, the developer rules, which can be the default rules, are evaluated because a particular event is not addressed by either the customer rules or the vendor rules. In an embodiment, the customer rule content takes precedence over the vendor rule content, which takes precedence over the developer rule content.

When implementing the updated rule set, the operation of the enhanced rules are altered based on the enhancement category and enhancement type input into the enhanced rule. The precedence of the enhancement is based on the enhancement type entered by the customer (i.e., a third party). In an embodiment, the customer's enhancement type takes precedence over the enhancements made by the vendor, or another second party, and the enhancements made by the vendor depending upon enhancement type take precedence over the initial rules set by the developer, or another first party.

A method to ensure the above described order precedence occurs without conflicts or contradictions can be implemented by having the enhancements assigned to the entities that made the enhancements and set the enhancement categories and enhancement type. These entities can be called issuers and the issuers can be arranged in an issuer hierarchy.

Figure 4:
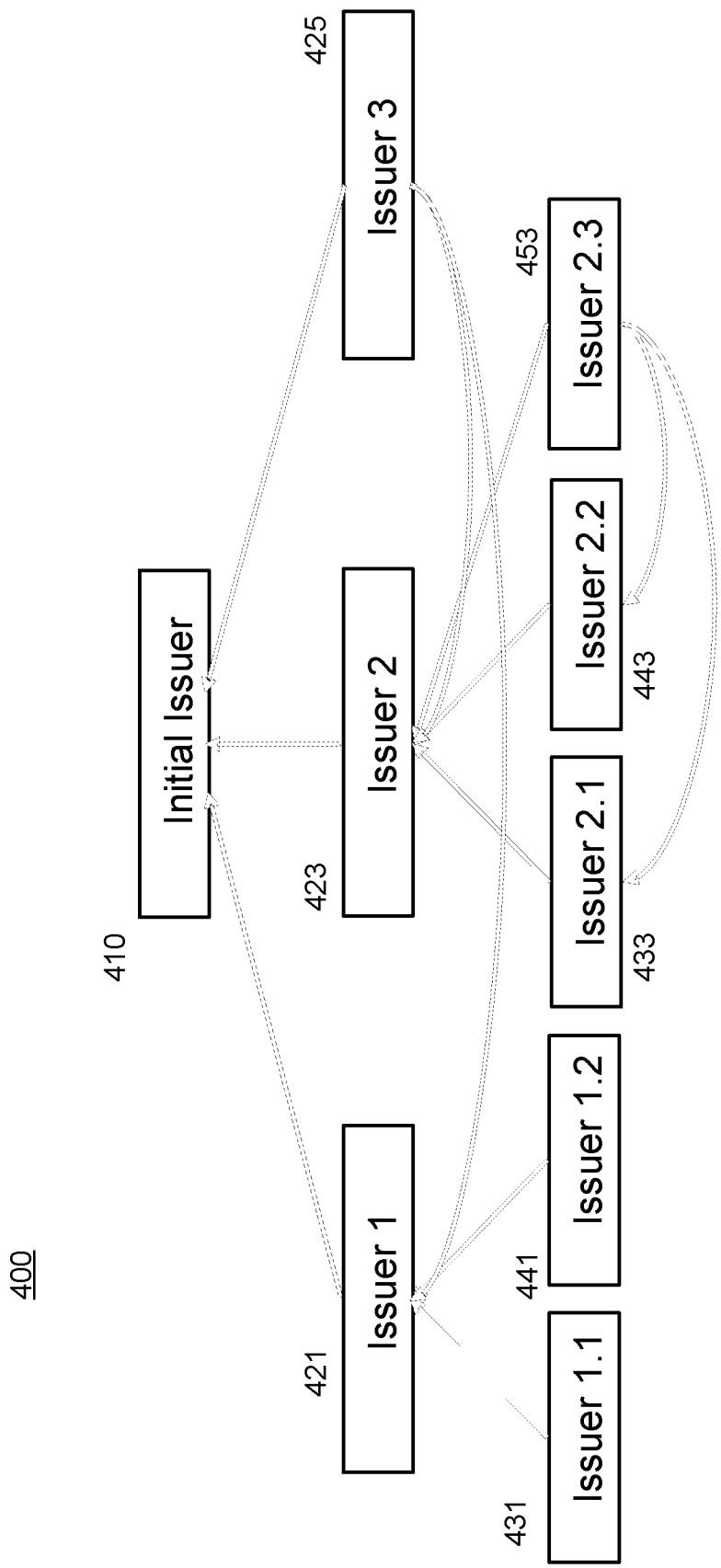
FIG. 4 illustrates an example issuer hierarchy according to an embodiment of the present invention.

FIG. 4 illustrates an exemplary issuer hierarchy according to an embodiment of the present invention. The exemplary issuer hierarchy 400 is built by an initial issuer 410. In an embodiment, an issuer 410 is a content supplier that creates initial objects (initial owner) or creates enhancements of objects. Examples of issuers are the developer, the partner/vendor and customer. More specifically, an issuer may be a department within the developer, such as an international branch that develops software specific to particular countries, or an industry-specific branch that develops software for specific industries such as shipping or accounting, or one of a number of country specific or industry developer partners that assist with ensuring that the software product is compatible in a certain business environment or computer environment. In an embodiment, the customer is an issuer, and, if a corporate customer, may have a number of divisions that can also be issuers.

There can be a number of steps in the creation of an enhancement. For example, in a first step, the issuer has to be set at the object to be enhanced. From this point on, all changes are enhancements of the object for the specific issuer. Before an issuer can be used, it is checked if the issuer enhancements can be revised, i.e. enhanceable, has an enhanceable status (in the system, software layer). If the issuer is enhanceable, an issuers rules can be enhanced based on an enhancement category of the rule.

The enhancement can be saved. The issuer remains set, and a save is triggered. All of the enhancement data from an enhancement buffer can be written into a database with reference to the issuer. Also the object buffer can be written into the database or data storage. The object data is written into a data structure called an enhancement table or e-table, an initial issuer as a key. Thus, the enhancement is assigned to the specific issuer based on the key.

In an embodiment, the initial issuer 410 can bundle the enhancements of several objects obtained by accessing an e-table, and also define the relationship to or the dependency of the enhancements on other issuers. The initial issuer 410 begins to build the hierarchy 400. Any issuer that is to receive enhanced rule content is indicated as allowing enhancement to its rule content by having an appropriate enhancement category set. The children issuers, issuers 421, 423, and 425 are allowed to further enhance the rules of initial issuer 410 by revising attributes in the rule content provided by initial issuer 410. Similarly, issuers 431 and 441 are allowed to further enhance the rules of issuer 421, and issuers 433, 443 and 453 are allowed to further enhance the rules of issuer 423. But issuer 425 is not enhanced by any other issuers. Issuers set fields in the rule content that allow further enhancements by setting an enhancement category.

In an embodiment, in the case of multiple enhancements for the same issuers, an order is defined. The default order is defined by the order of a global unique identifier assigned to each issuer. Since both issuer 431 and issuer 441 are able to enhance the rule content of issuer 421, each is assigned an order in which the child issuer is allowed to enhance the rule content of the parent issuer. For example, issuers 421, 423 and 425 are assigned the names "issuer 1", "issuer 2" and "issuer 3", respectively. Issuer 431 is assigned the name "Issuer 1.1" and issuer 441 is assigned the name "Issuer 1.2", and issuers 433, 443 and 453 are assigned the names "issuer 2.1", "issuer 2.2" and "issuer 2.3", respectively. For example, the issuer 1 can be a division within the developer organization, issuer 2 can be vendor partner, and issuer 3 can be a customer.

In an embodiment, the assignment of issuer 1 to issuer 421 means that the enhanced rules provided by issuer 421 take precedence over the enhanced rules of issuer 2 (423). Similarly, the enhanced rules provided by issuer 423 take precedence over the enhanced rules of issuer 3 (425). The same is true for issuers 1.1 and 1.2 as well as issuers 2.1, 2.2 and 2.3, respectively.

Issuers, such as 421, 423, 431, and so on, may also define restrictions in terms of the orders of issuers, i.e., if other issuers need to be activated or deactivated. Activating meaning, for example, that the content of the issuer will be implemented, and deactivated meaning, for example, that the content of the issuer will not be implemented. In an example, one issuer may need the rules of a preceding or parent issuer in the context of a country specific rule set, but another issuer may not operate in that specific country, so the another issuer can deactivate the parent issuer. The order of precedence also defines the order in which sibling issuers, i.e., issuer 433 and issuer 443, can be deactivated by issuer, i.e., issuer 453. In other words, a sibling lower in the hierarchy, such as issuer 3 (425), can deactivate an issuer higher in the hierarchy, such as issuers 1 (421) and issuer 2 (423), but the converse is not true. Issuers 1 (421) and 2 (423) cannot deactivate issuer 3 (425) because as issuers higher in the hierarchy they are not aware of the presence of issuer 3. In an embodiment, an issuer may not deactivate an issuer upon which it may depend. For example, issuer 1.2 may not deactivate issuer 1 because issuer 1.2 may rely on a rule from issuer 1 to determine a result. Another limitation is that issuers can only deactivate issuers with which they have a relationship. For example, issuer 1.2 (441) is unable to deactivate issuer 1.1 (441) because it is not related to it as are issuers 2.3 (453) and issuer 2.1 (433). Although deactivation is used in the above examples, it should be understood that similar limitations apply to activation of issuers. Improper activation or deactivation can cause a failure of the software.

During development of the rule content at the developer, development objects are used to form the application programming interface (API).

In an embodiment, issuers can also have effects on a catalog, which can be a collection of codes with related contents. Subsets of codes can be grouped within a catalog according to various criteria. Selected sets of codes can also be created for a particular purpose.

A catalog reduces the complexity of the rules maintenance for the business user. One of the purposes of a catalog is to hide the (technical) computer object repository. It preferably displays and structures the computer objects which are relevant for maintenance of business rules. A primary use of a catalog is as a user interface. With the above-described enhancement capability incorporated into a catalog, it becomes possible that different parties add their content to a subject independent from each other. The business user finds all the computer objects for one subject in one catalog—independent of who is responsible for the individual object.

The exemplary implementation is based on the premise that each enhancement of a rule is identified by which entity made the enhancement, the identified or assigned entity, i.e., issuer, is responsible for the change. The inventors realized the benefits of assigning each enhancement to an issuer. The enhancements are stored with the rule sets. By storing the rule sets, which can include enhanced rules and a copy of the initial rule set, produced by each issuer, it is possible to merge and re-merge the enhancements with the previous rule set, whenever necessary. It is also beneficial that the rule sets can also be stored, in the order in which, the enhancements are to be applied. In an embodiment, technically, this is the same as order of the issuers.

Referring back to FIG. 4, the order of the issuers can be set when the issuer is created, but it need not be done at that time, or may inadvertently not be done at the time. For example, when issuers 1.1 (431) and 1.2 (441) are created, these issuers may have the order that the rule set of issuer 1.1 be applied first with respect to the rule set or issuer 1.2 (441), In other words, the rule set of issuer 1.1 (431) will have precedence over the rule set of issuer 1.2 (441). However, consider the case where issuer 1.1 (431) is created by a first user at an earlier date and issuer 1.2 (441) is created by a second user at a later date, and no order is set between them. If the order of the issuers can not be determined from of the available information, this order has to be defined by the customer.

Usually the order can be determined by the fact, that for each issuer it is stored which other issuer he may enhance. In cases where enhancements from different content vendors (technical different issuers) are integrated in one system, which are enhancing the same rule or relying upon the same prior existing enhancement, it might become necessary for the user of the software to define the order between such issuers before the merge of the enhancements can take place. So the order can be established as described above with respect to FIG. 4.

In an exemplary embodiment that facilitates merging, the order of the issuers is determined. The order of the issuers can be defined at the time of creation of the issuers or manually when two or more issuers are determined to be allowed to enhance the same parent issuer.

In an embodiment, to further facilitate the merge and re-merge operations, the enhancement category of the rule is determined. An application programming interface (API) allows enhancements. i.e., revisions, to be made to rules in the rule set according to the enhancement category set for the rule in the rule set. The enhancement category defines which attributes of a rule may be changed by an enhancement made by a child issuer, so that the parent enhancement (or the initial object) can be changed without causing conflict during a merge or re-merge. Additionally, the enhancement category can define how the initial object (or enhancements which were defined as enhanceable) may be changed.

In the example of a catalog, a node, which was set as enhanceable by the initial object, may not be deleted as child enhancements referring to this node would become inconsistent if the node of the initial object would be deleted.

In the example of a decision table, no condition column may be deleted if the initial object (decision table) was defined as enhanceable with new rows, as this enhancement category shall give the ones how enhance such an object shall rely on the number and semantic of the condition columns.

In an embodiment, having prerequisites that (1) the enhancements do only change the rule according to the enhancement category of the initial object (or the parent enhancement), and (2) that the issuers are sorted according to order, the merge and re-merge of the enhancements can work in a way that each enhancement is taken as a change of the initial rule set object according to the order of the issuer's and the enhancement categories.

In an embodiment, rule content can be created and/or changed using, preferably, any business rules framework, such as BRFplus™ provided by SAP. The initial object creation is not different except for the definition of an enhancement category. The default is that enhancements are not supported. In an embodiment, this object cannot be changed in other software layers. However, after the creation of an issuer (which can be created as any other BRFplus™ objects) with a method (such as, for example, a SET_ISSUER method in BRFplus™ provided by SAP), the initial object can be set into an enhancement mode, when the initial object allows for enhancements. Operations including attribute changes, transport, and saves can be performed on the issuer dependent data including the enhancements. In an embodiment, the transport, for example, only writes the enhancements but not the object itself. The object will be shown in the user interface as the merged object including data from the initial object as well as the enhancement(s).

Although the above example was described using specific software objects, instances, routines and the like, it should be understood that these are exemplary to aid in an understanding of the invention, and should not limit the claims to the specific example.

Figure 5:
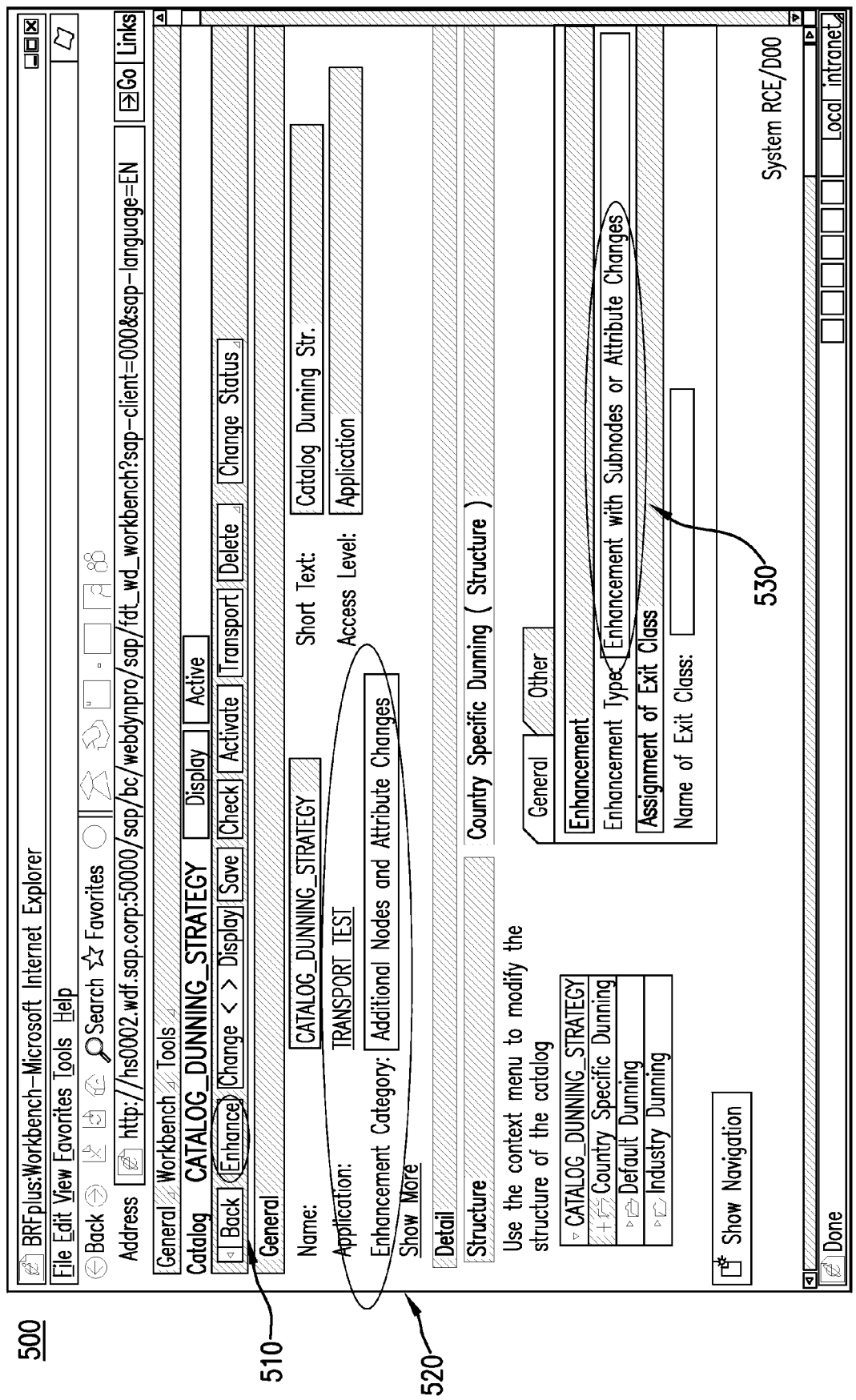
FIG. 5 illustrates a screenshot of an example graphical user interface according to an embodiment of the present invention.

FIG. 5 illustrates a screenshot of an exemplary graphical user interface for changing a catalog according to an embodiment of the present invention. In the user interface 500, there are exemplary controls, such as enhance control 510, for indicating instructions for updating the catalog. The enhancement category 520 indicates the owner of the "catalog dunning strategy" allowed enhancement by additional nodes and attributes. The enhancement type 530 indicates that country specific attributes can be enhanced with subnodes or attribute changes.

The following describes exemplary details of revising objects in the user interface illustrated in FIGS. 5 to 9. When an object is selected for being revising in the user interface, it is checked if the original can be revised. If not maybe there are issuers that define enhancements. In this case, or when new enhancements should be created (for example, the object to be revised supports the enhancement concept), the user selects the issuer for which the revision should take place.

With the original object or with an issuer set, assigned or identified in a data field, the user interface checks what parts of an object can be revised. This is done by checking the setting of the enhancement category in, for example, a data field. In case of an enhancement, only some parts are revisable. The rest is read only.

When the issuer making the enhancement, or revision, is set to save the enhancement, the issuer is checked to confirm that it is an active issuer (i.e., it has not been deactivated by another issuer). Only the changes, or deltas, are saved to the production table.

Figure 6:
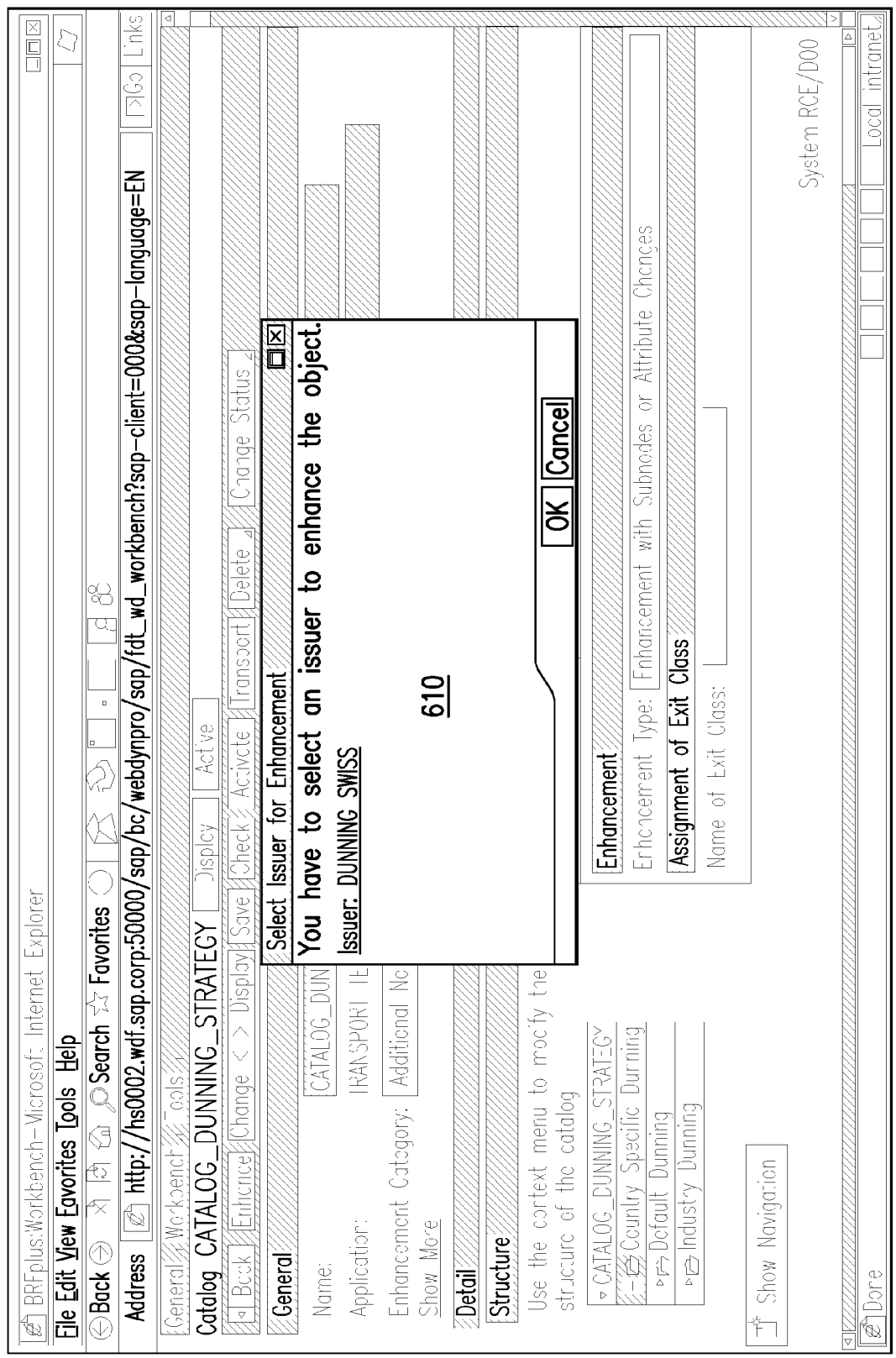
FIG. 6 illustrates a screenshot of an example graphical user interface according to an embodiment of the present invention.

FIG. 6 illustrates another screenshot of an exemplary graphical user interface for changing a catalog according to an embodiment of the present invention. In the user interface 600, an issuer can set the catalog to be enhanced. In the control 610, the use has selected an issuer, in this case, Dunning Swiss to enhance the object or catalog.

Figure 7:
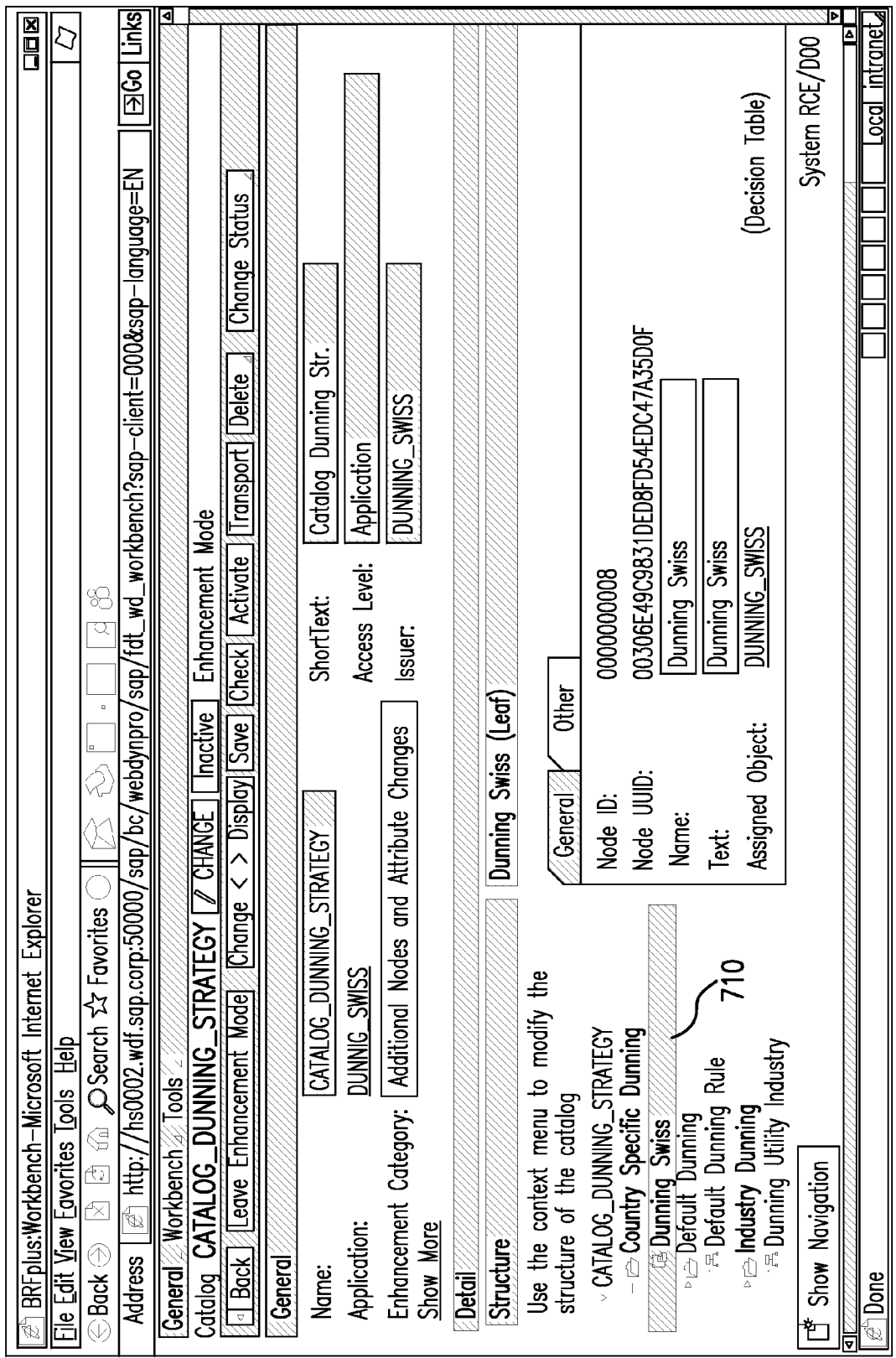
FIG. 7 illustrates a screenshot of an example graphical user interface according to an embodiment of the present invention.

FIG. 7 illustrates another screenshot of an exemplary graphical user interface for changing a catalog according to an embodiment of the present invention. The user choice of the Dunning_Swiss issuer gives the selected issuers, e.g., country specific development, the opportunity to add country specific content to the catalog. As shown in the interface 700, the Dunning_Swiss issuer 710 is shown in the context menu to enhance the catalog with a Swiss specific dunning decision table. This invention allows the addition of such country specific content independent of other enhancements which might be added in other layers in the software and content distribution chain. The content added on a layer can be merged with content which is distributed into the system where the (in this example) Swiss specific content was added. If the Swiss specific content is distributed further it can be merged with content which is available in this target system.

Figure 8:
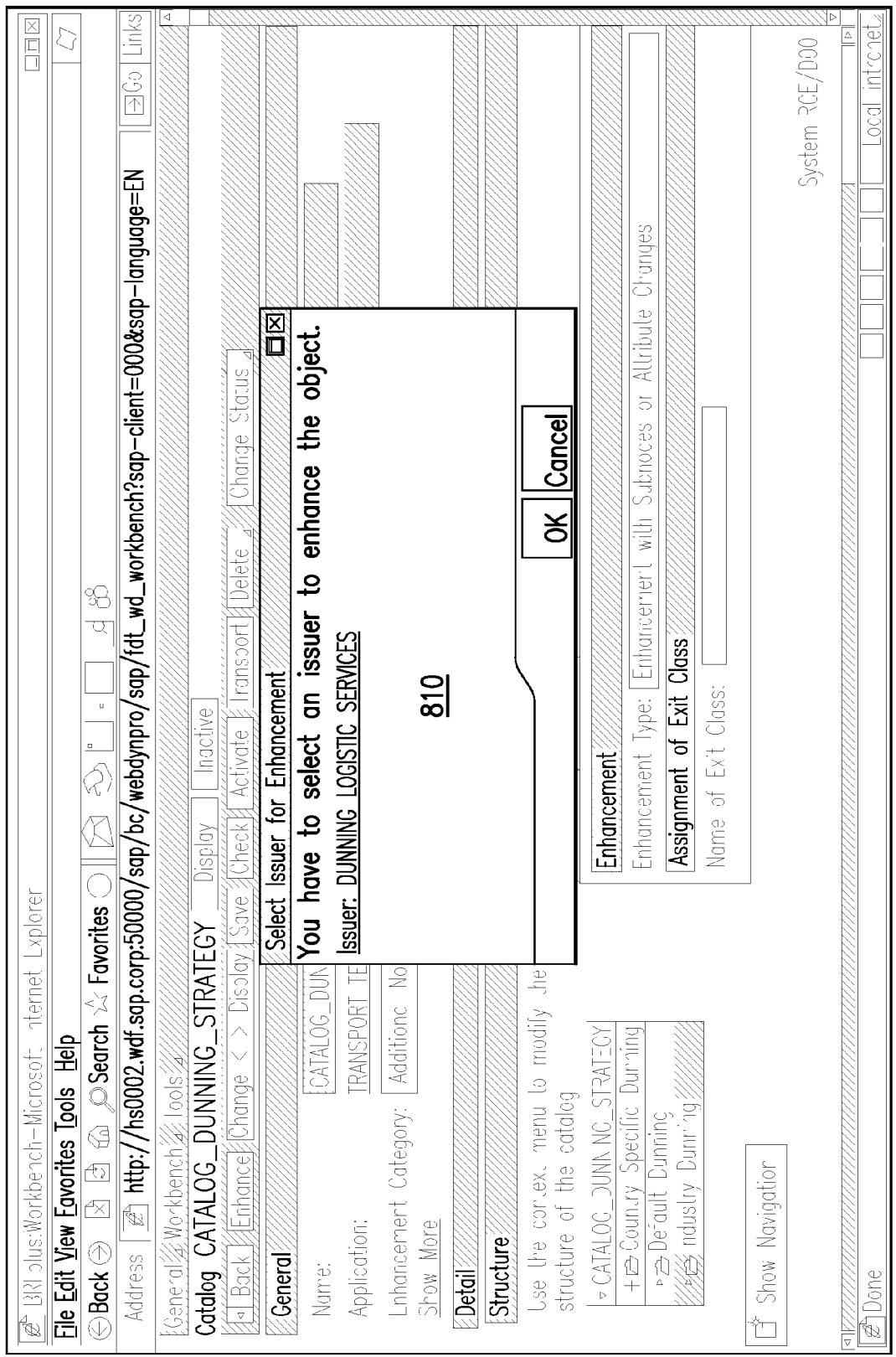
FIG. 8 illustrates a screenshot of an example graphical user interface according to an embodiment of the present invention.

FIG. 8 illustrates another screenshot of an exemplary graphical user interface for changing a catalog according to an embodiment of the present invention. In the interface 800, another issuer 810 is shown being selected to enhance the catalog.

Figure 9:
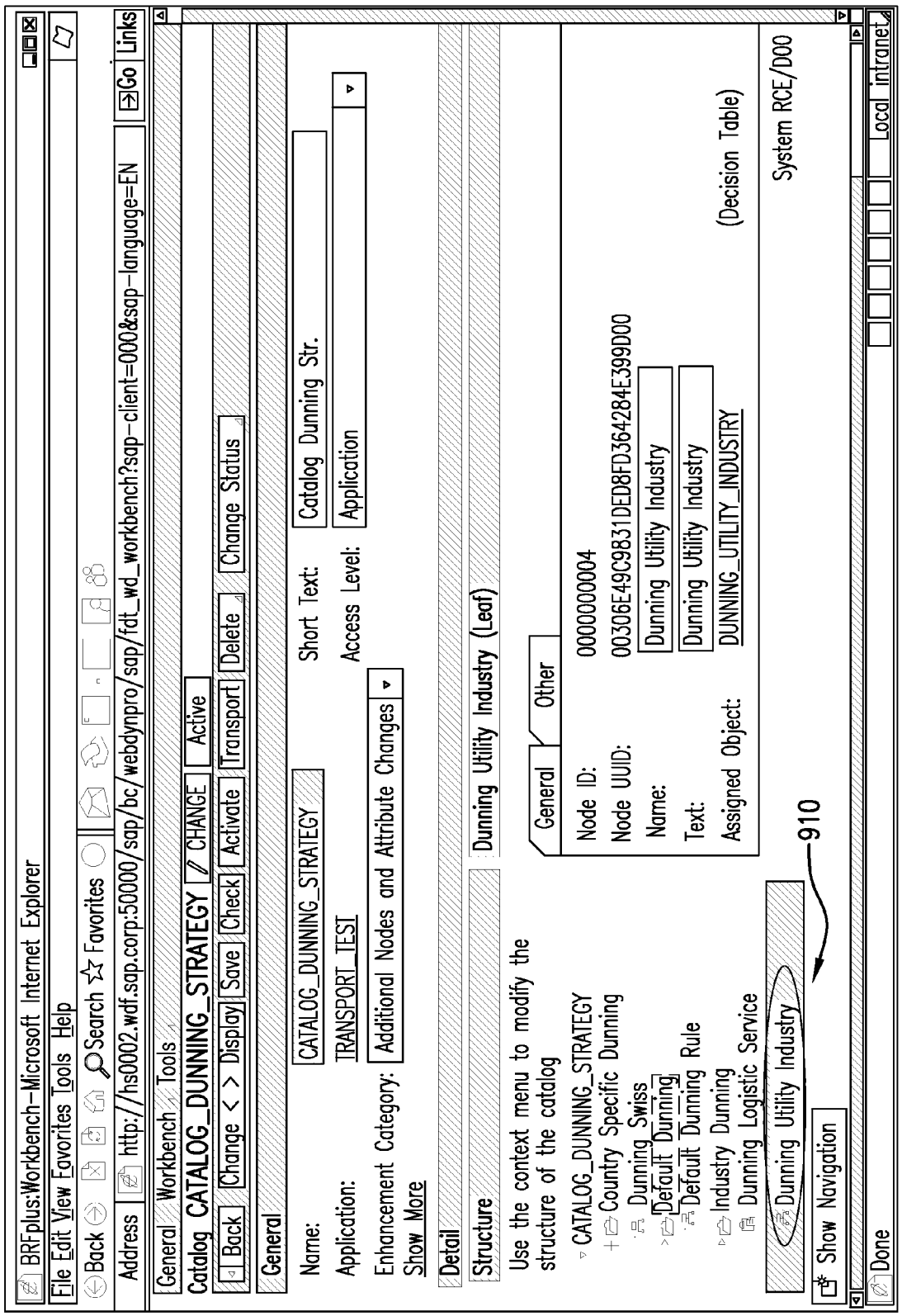
FIG. 9 illustrates a screenshot of an example graphical user interface according to an embodiment of the present invention.

FIG. 9 illustrates another screenshot of an exemplary graphical user interface for changing a catalog according to an embodiment of the present invention. In the interface 900, industry specific content 910 can be added independent from the initial catalog and the Swiss specific content, and delivered to the customer.

Merging relates to the activity of putting the initial object and enhancements for the object together so that one enhanced object is created. Such objects can also be called merged objects. Merges can be triggered by transport after import methods or by XML imports or from a user interface. Adding content to a computer system can be done by accessing data, such as the rule content, from a hard disc. In which case, the merge has to be started manually. It can also be done in that way that a software function is called to give the software access to the new content. If so this function can save the new content not only in its own storage medium, but also perform additional operations on the content. This mechanism can be used to merge the enhancements during the transport or the XML import.

Typically, the rules are implemented when all of the enhancements have been made to the rule content. To insure that the rules operate as desired by the parties that have made enhancements, the enhanced rules must be merged. Before the merge all conflicts have to be resolved, which can be done, for example, according to issuer order. For example, referring back to FIG. 3, in a decision table implementation, a developer provides a decision table that allows enhancement, and both the partner and the customer make enhancements. The enhanced decision table is made by merging the developer-provided decision table with the enhancements made by the partner and the customer. The enhanced decision table is evaluated for contradictions and conflicts between the events and results that will be output by evaluation of the decision table.

In an embodiment, the initial rule set as well as the enhanced rules are stored in databases. The initial rule set and existing enhancements are stored in a production database. Enhancements when recently made are stored in data structures referred to as enhancement data tables, or e-tables. Referring back to the delivery distribution chain of software, once the software is delivered to the customer from the developer via a vendor, and the customer has customized the software to its business process by making enhancements. The customer enhancements and the initial rule set with any vendor enhancements must be merged for a final rule set to be implemented for use by the customer. Therefore, the enhancements made by the customer that are stored in e-tables does not match the data stored in the production tables, the production tables containing the rule set of the developer and vendor. The merge operation occurs upon first implementation, afterwards re-merge operations occur to incorporate any future enhancements to the rule set.

Re-merging of an object means the e-table data and the data in the production tables do not fit together. The production tables contain the object including all enhancements. Therefore each object that supports enhancements is subject to a merge method that allows merging (first merge) or re-merging (following merges). A merge is in its simplest form, a loading of an object from an e-table in a database (memory data is discarded, merging with unsaved data is stopped by an exception) including all enabled issuer enhancements. Then the object data is recreated and written into the production object tables.

Figure 10:
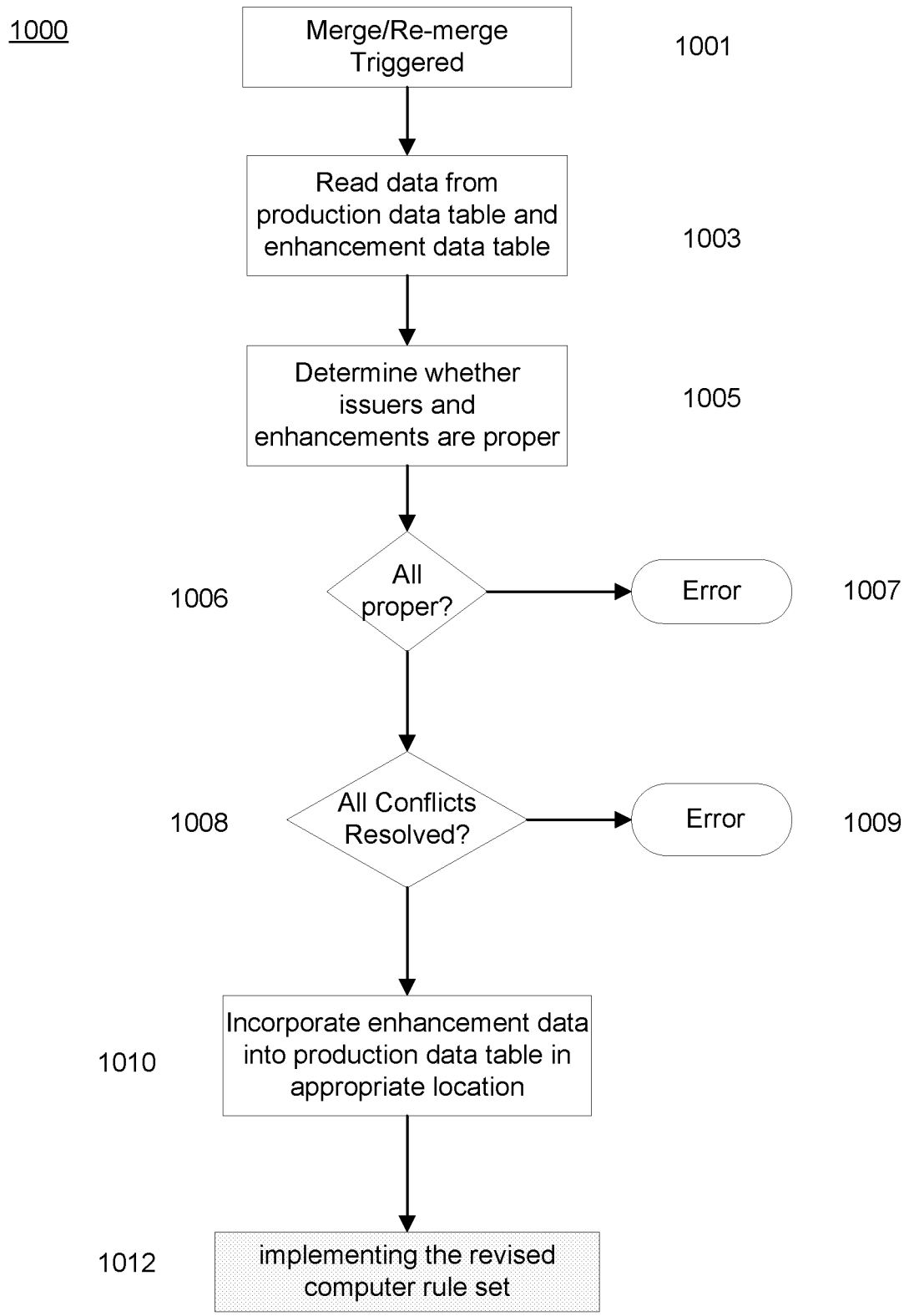
FIG. 10 illustrates a flowchart of an example merge embodiment according to the present invention.

Merging and re-merging will be described with reference to FIG. 10. The exemplary process 1000 begins with an action that triggers the merge or re-merge. Actions that trigger merge are a first implementation, or use of the rule set, after either a vendor enhancement, or customer enhancement or both of the initial rule set and enhancements. Actions that trigger a remerge can include a change to issuer data issuer dependencies, or a change to enhancement data by transport. The change to issuer data issuer dependencies has been described above. However, transport changes result from the incomplete transfer of date for whatever reason. Transports will be described later in more detail.

A process for loading an object having enhancements can be accomplished by reading data of the object from a database. The object data is read from data storage, for example, a production table, without comparing specific differences to objects that do not support enhancements.

Additional data related to object enhancements, stored in a data structure that can be called enhancement data tables (e-tables), is also read from a database. The e-tables can be copies of production data tables. These copies are not versioned but are assigned to an issuer by setting, for example, a key field. Only enhancement data for active issuers (i.e., not issuers that have been deactivated by other issuers) is read. In an embodiment, only enhancement data for the specific object is read.

The e-table data in the object buffer can be saved with reference to the issuer to which it is assigned. The production table can contain a merged rule content, which means the data of the original objects plus the enhancement data have been merged and any and all conflicts have been resolved.

The data is read from the e-table and the production table (1003). The read data is analyzed for conflicts between rules and enhancements and the like. For example, the issuer order is confirmed, issuer status is checked to determine whether the issuer is activated or deactivated, the enhancement category related to any enhancements is confirmed, and all are analyzed to insure an operating set of rules results. Any conflicts are preferably resolved. (1005)

In an embodiment, a decision is made whether the issuers and the enhancements are proper. Proper meaning at least that the issuers are active, the enhancements are allowed based on a check of the enhancement category, and the like (1006). If the enhancements are not proper, an error is indicated (any conflicts remain unresolved (Step 1007). If the enhancements are proper, it is decided whether any and all conflicts have been resolved. (1008). if not, an error message is output (1009). If all conflicts have been resolved, the process completes the re-merge by incorporating the delta, or enhancement, data from the e-tables into the production tables (1010). With all of the conflicts resolved, the revised, or enhance, computer rule set can be implemented with the operation of the rules is different from the operation of the rule in the initial rule set based on the enhanced data received from the issuer (1012). The data in the e-tables can be erased or maintained until future enhancements are made.

The above description of exemplary processes can be used to implement merging and re-merging according to exemplary embodiments of the present invention. While merging is an initial process it is performed at the first implementation of the rule set at a customer. Therefore, since re-merging is more often to occur the example will be described in the context of re-merging, but it should be understood that a similar process can be used for merging.

A transport can be the transfer of system components from one system to another. The components to be transported are specified in an object list of a transport request. Each transport consists of an export process and an import process: the export process reads objects from the source system and stores them in a data file at an operating system level; and the import process reads objects from the data file at the operating system level and writes them to the database of the target system. A transport log of all actions during export and import can be maintained in a database accessible by both systems or at either system. A transport may change the enhancement data. A transport of an enhancement comprises e-table data only but not the "production" tables of the objects. In an embodiment, whenever there is a change in the e-tables, the object needs to be re-merged.

In an embodiment, objects that support the enhancement concepts can transport either the original object or the enhancement at a point in time (one call of the transport method). In case of the original object (prepared for enhancements but without enhancements) the production tables are written. But not all production tables are written. Some tables are replicated (a corresponding e-table exists. Instead the e-tables are written with the key initial issuer.

In an embodiment, before an enhancement is transported, an issuer has to be set or assigned. Whenever an issuer is set, all operations are done only for the issuer, which means, all operations, including the enhancement, are assigned to the issuer. In the case of transport, all entries from the e-tables for the specific issuer are transported.

There can be a plurality of transport objects. As soon as an object is prepared for enhancements (the enhancement category is set to other than "Not Supported"), transport recording also writes entries into these additional transport objects, even when no enhancement has been defined yet. A user may miss some of the entries in the "production" transport objects, which is acceptable. The new entries replace the old ones. As soon as an enhancement is recorded, the issuer for which the enhancement was created is also recorded.

FIG. 11 illustrates an exemplary system for delivering software suite enhancements. The exemplary system 1100 comprises servers 1110a-d, data storages 1120a-d, and at least one customer terminal 1112. The rules content is available on each of the servers 1110a-d. Server 1110a and data storage 1120a, labeled DEVELOPER, can be used by a software developer. A rules engine on server 1110a can generate a default rule set for a process, such as a business process, and stored on data storage 1120a for later delivery. The default rule set on server 1110a can be delivered to a vendor, and stored in data hosted on server 1110b. Delivery can be accomplished by a number of ways, such as downloading, or uploading from disk, or other methods and means known by those of ordinary skill in the art. The default rule set can be revised anywhere along the supply chain of software delivery. The vendor using server 1110b and data storage 1120b can revise, or enhance, the rule content based on areas of specialization, countries in which the software will be used and the like. The vendor can provide the software to customers A and B, who will user servers 1110c and 1110d with data storage 1120c and 1120b to further customize the default rules and vendor modified rules according to the customers A and B particular business or provide general rules which have to be followed company wide, and other rules that might be added for a country or industry specific specialization.

Merging and remerge can take place wherever revisions are made, at the developer, vendor or customer. The initial rule set, generated by a developer, can be hosted on server 1110a and stored on data storage 1120a. The initial rule set can be shipped to a vendor. The shipping can be performed by any number of known methods, such as downloading or accessing from known types of data storage media. The vendor can host the initial rule set on vendor server 1110b and stored on data storage 1120b. Any revisions to the initial rule set made by vendor to the initial rule set can be stored at data storage 1120b. The vendor can also choose the merge the initial rule set with the vendor revisions using server 1110b. Alternatively, the vendor can ship the vendor revisions and the initial rule set to a customer, such as customer A, who can host the initial rule set and vendor revisions on server 1110c and data storage 1120c.

Customer A can choose to merge the initial rule set, vendor revisions and the customer A's own revisions into an enhanced rule set that can be implemented for execution of the customer A's business process. Alternatively, if the vendor provided had merged the vendor's revisions with the initial rule set, customer A using server 1110c and data storage 1120c can re-merge the rules with customer A's own revisions. Customer A can ship the enhanced rules to customer B. Customer B can be, for example, a subsidiary of customer A, and may need to make revisions to the enhanced rule set provided by customer A. Using server 1110d and data storage 1120d, customer B can make its own revisions and re-merge the enhanced rule set provided by customer A with the revisions made by customer B. Other combinations of shipping, revisions, merging and re-merging are also contemplated, but for the sake of brevity are not described in detail.

The computer rule set including program instructions can be stored on computer readable media such as discs, including CD and DVD, flash memory, hard drives including magnetic and optical drives, or any other suitable computer readable media, and that will cause a computer or processor to execute the program instructions. The software language used to write the software to implement the above method can be any that is suitable for implementing the described exemplary embodiments, and such languages are known to those of skill in the art.

It should be understood that there exist implementations of other variations and modifications of the invention and its various aspects, as may be readily apparent to those of ordinary skill in the art, and that the invention is not limited by specific embodiments described herein. Features and embodiments described above may be combined with and without each other. It is therefore contemplated to cover any and all modifications, variations, combinations or equivalents that fall within the scope of the basic underlying principals disclosed and claimed herein.

What is claimed is:

1. A method for revising content in a computer rule set, the revisions made by at least an issuer of content, comprising:
   determining if a difference exists between content data in a production table corresponding to an initial computer rule set and enhanced content data in an enhanced data table, wherein the content data and enhanced content data include at least one attribute, the at least one attribute is an action in a process operation, the enhanced content data is content revised by a first issuer and a second issuer and corresponds to a rule in the computer rule set, and the content data includes at least 1) an enhancement category to indicate issuers having permissions to enhance the content data, 2) an enhancement type to indicate specific portions of the content data that can be enhanced, and 3) a data field to indicate an issuer that enhanced the content data;
   in response to determining a difference exists, reading the content data from the production table corresponding to the initial computer rule set and the enhanced content data from the enhanced data table;
   identifying enhancement data that is assigned to the first issuer and enhancement data that is assigned to the second issuer;

calculating a precedence between the enhancement data that is assigned to the first issuer and the enhancement data that is assigned to the second issuer;

confirming whether the rule enhanced in the computer rule set is allowed to be revised based on at least one of the enhancement category and the enhancement type;

based on the results of the determining and confirming, incorporating the enhanced data from the enhanced data table into the production data table to provide a revised computer rule set, wherein the incorporation includes merging, based on the calculated precedence, the enhanced data with corresponding portions of the content data that can be enhanced by the first issuer and the second issuer as indicated by the at least one of the enhancement category and the enhancement type; and implementing the revised computer rule set, wherein operation of the rules is different from the operation of the rule in the initial rule set based on the enhanced data.

2. The method of claim 1, wherein the set of computer rules include a rules hierarchy, wherein rules established by the first issuer include an attribute field.

3. The method of claim 1, wherein the revised computer rule set is specific to the first issuer.

4. The method of claim 1, wherein in the incorporating the enhanced data into the production data table occurs only if the results of the determining and the confirming identify the first issuer as active and the enhanced rule is allowed to be revised.

5. The method of claim 1, comprising:

prior to the determining if a difference exists, triggering a merge process by attempting to implement the initial computer rule set for a first time by a customer.

6. A non-transitory machine-readable storage medium embodied with computer instructions for causing a computer to execute the instructions to implement a method for revising content in a computer rule set, the revisions made by at least an issuer of content, the instructions comprising:

determining if a difference exists between content data in a production table corresponding to an initial computer rule set and enhanced content data in an enhanced data table, wherein the content data and enhanced content data include at least one attribute, the at least one attribute is an action in a process operation, the enhanced content data is content revised by a first issuer and a second issuer and corresponds to a rule in the computer rule set, and the content data includes at least 1) an enhancement category to indicate issuers having permissions to enhance the content data, 2) an enhancement type to indicate specific portions of the content data that can be enhanced, and 3) a data field to indicate an issuer that enhanced the content data;

in response to determining a difference exists, reading the content data from the production table corresponding to the initial computer rule set and the enhanced content data from the enhanced data table;

identifying enhancement data that is assigned to the first issuer and enhancement data that is assigned to the second issuer;

calculating a precedence between the enhancement data that is assigned to the first issuer and the enhancement data that is assigned to the second issuer;

confirming whether the rule enhanced in the computer rule set is allowed to be revised based on at least one of the enhancement category and the enhancement type;

based on the results of the determining and confirming, incorporating the enhanced data from the enhanced data table into the production data table to provide a revised computer rule set, wherein the incorporation includes merging, based on the calculated precedence, the enhanced data with corresponding portions of the content data that can be enhanced by the first issuer and the second issuer as indicated by the at least one of the enhancement category and the enhancement type; and implementing the revised computer rule set, wherein operation of the rules is different from the operation of the rule in the initial rule set based on the enhanced data.

7. The non-transitory machine-readable storage medium of claim 6, wherein the set of computer rules include a rules hierarchy, wherein rules established by the first issuer include an attribute field.

8. The non-transitory machine-readable storage medium of claim 6, wherein the revised computer rule set is specific to the first issuer.

9. The non-transitory machine-readable storage medium of claim 6, wherein in the incorporating the enhanced data into the production data table occurs only if the results of the determining and the confirming identify the first issuer as active and the enhanced rule is allowed to be revised.

10. A system for revising content in a computer rule set, comprising:

a display device for displaying a graphical user interface;

a data storage for storing data;

a processor for executing computer program instructions, the instructions comprising:

determining if a difference exists between content data in a production table corresponding to an initial computer rule set and enhanced content data in an enhanced data table, wherein the content data and enhanced content data include at least one attribute, the at least one attribute is an action in a process operation, the enhanced content data is content revised by a first issuer and a second issuer and corresponds to a rule in the computer rule set, and the content data includes at least 1) an enhancement category to indicate issuers having permissions to enhance the content data, 2) an enhancement type to indicate specific portions of the content data that can be enhanced, and 3) a data field to indicate an issuer that enhanced the content data;

in response to determining a difference exists, reading the content data from the production table corresponding to the initial computer rule set and the enhanced content data from the enhanced data table;

identifying enhancement data that is assigned to the first issuer and enhancement data that is assigned to the second issuer;

calculating a precedence between the enhancement data that is assigned to the first issuer and enhancement data that is assigned to the second issuer;

confirming whether the rule enhanced in the computer rule set is allowed to be revised based on at least one of the enhancement category and the enhancement type;

based on the results of the determining and confirming, incorporating the enhanced data from the enhanced data table into the production data table to provide a revised computer rule set, wherein the incorporation includes merging, based on the calculated precedence, the enhanced data with corresponding portions of the content data that can be enhanced by the first issuer and the second issuer as indicated by the at least one of the enhancement category and the enhancement type; and implementing the revised computer rule set, wherein operation of the rules is different from the operation of the rule in the initial rule set based on the enhanced data.

11. The system of claim 10, wherein the set of computer rules include a rules hierarchy, wherein rules established by the first issuer include an attribute field.

12. The system of claim 10, wherein the revised computer rule set is specific to the first issuer.

13. The system of claim 10, wherein in the incorporating the enhanced data into the production data table occurs only if the results of the determining and the confirming identify the first issuer as active and the enhanced rule is allowed to be revised.

* * * * *